United States Patent

Schonlau et al.

[11] Patent Number: 6,112,616
[45] Date of Patent: Sep. 5, 2000

[54] BRAKE PEDAL MECHANISM FOR AUTOMOTIVE VEHICLES

[75] Inventors: Jurgen Schonlau, Walluf; Ralf Harth, Darmstadt; Wolfgang Ritter, Oberursel, all of Germany

[73] Assignee: ITT Manufacturing Enterprises, Inc., Wilmington, Del.

[21] Appl. No.: 09/142,346

[22] PCT Filed: Jan. 22, 1997

[86] PCT No.: PCT/EP97/00286

§ 371 Date: Jan. 18, 1999

§ 102(e) Date: Jan. 18, 1999

[87] PCT Pub. No.: WO97/30876

PCT Pub. Date: Aug. 28, 1997

[30] Foreign Application Priority Data

Feb. 22, 1996 [DE] Germany .............. 196 06 427

[51] Int. Cl.⁷ .............. G05G 1/14; B60K 28/14
[52] U.S. Cl. .............. 74/512; 180/274
[58] Field of Search .............. 74/512, 560; 180/274, 180/275

[56] References Cited

U.S. PATENT DOCUMENTS

| 3,698,260 | 10/1972 | Shellhause . | |
|---|---|---|---|
| 5,848,558 | 12/1998 | Isono et al. | 74/512 |
| 5,848,662 | 12/1998 | Sakaue | 74/512 X |

FOREIGN PATENT DOCUMENTS

| 2361194 | 6/1974 | Germany . | |
|---|---|---|---|
| 3533420 | 3/1987 | Germany . | |
| 3904616 | 8/1989 | Germany | 74/560 |
| 4335511 | 5/1994 | Germany . | |
| 4340633 | 6/1994 | Germany . | |
| 4409235 | 10/1994 | Germany . | |
| 4409324 | 10/1994 | Germany . | |
| 4415642 | 12/1994 | Germany . | |
| 4344386 | 6/1995 | Germany . | |
| 2075926 | 11/1981 | United Kingdom . | |

OTHER PUBLICATIONS

Search report of the German Patent Office for Application 196 06 427.9. Date unknown.

*Primary Examiner*—Mary Ann Battista
*Attorney, Agent, or Firm*—Rader, Fishman & Grauer PLLC

[57] ABSTRACT

A brake pedal assembly for automotive vehicles has a pedal mounting support which is attached to a brake force booster or a vehicle body wall. A brake pedal used to actuate the brake force booster is pivotally mounted in the pedal mounting support. To eliminate the risk of foot injury in a collision, the points of support for the pivot axle of the brake pedal take the form of coulisse-type guides, in which the pivot axle is retained by a securing element, which, when moved by the action of a force caused during a collision, releases the pivot axle.

4 Claims, 3 Drawing Sheets

BRAKE PEDAL MECHANISM FOR AUTOMOTIVE VEHICLES

TECHNICAL FIELD

The present invention relates to vehicle brakes and more particularly relates to brake pedal assembly for automotive vehicles with a pedal mounting support.

BACKGROUND OF THE INVENTION

A pedal assembly of this general type is disclosed in German patent application No. 43 44 386. The pedal mounting support of the prior art pedal assembly is displaced in a collision due to its special shape such that the pedal pivot axle is released and the actuating pedal can be swivelled about the point of articulation of the actuating rod in the direction of the vehicle body wall.

The prior art system suffers from the shortcoming that it does not ensure that, in a crash, both axle bearings will be released simultaneously and uniformly such that a lateral turning away of the actuating pedal is fully effected and, thus, the risk of foot injury due to vehicle body wall deformations is fully eliminated.

An object of the present invention is to provide a brake pedal assembly of the type referred to hereinabove, which offers an optimal behavior in a crash and prevents the actuating pedal from turning away laterally and, thus, eliminating the risk of foot injury.

According to the present invention, this object is achieved because the points of support for the pivot axle are provided by coulisse-type guides, in which the pivot axle is retained by a securing element, which, when moved by the action of a force that is caused in a collision, releases the pivot axle.

DETAILED DESCRIPTION OF THE PREFERRED EMBODIMENT

Figure 1:
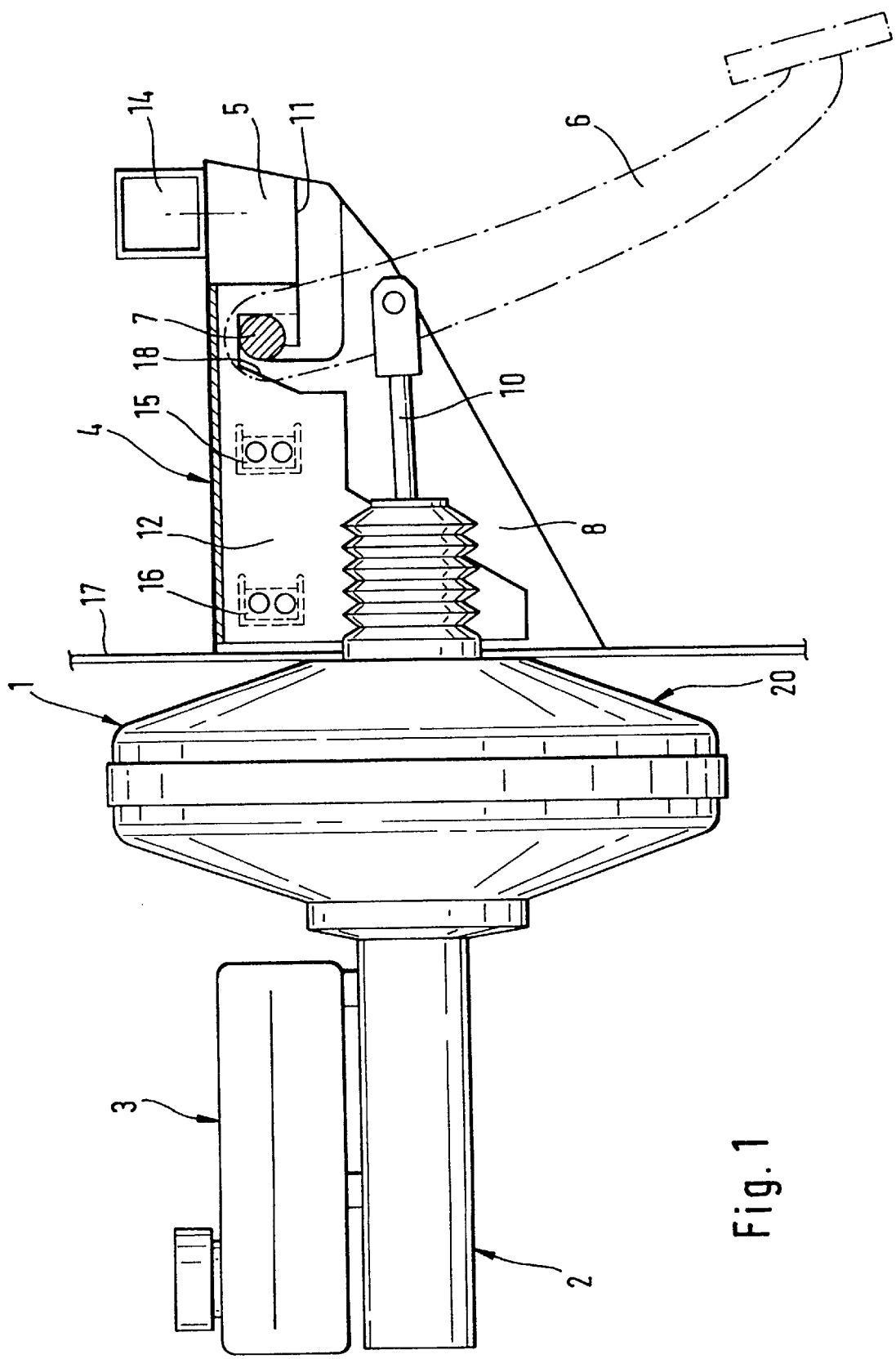
FIG. 1 is a view of an assembly for actuation of a hydraulic brake system, which includes a pedal assembly of the present invention (shown in a cross-section taken along the line of intersection 1—1 in FIG. 3) in an inactive position.

The assembly shown in the drawing for actuation of a hydraulic brake system for automotive vehicles includes a pneumatic brake force booster 1, a master brake cylinder 2 connected downstream of the brake force booster 1, a pressure fluid supply reservoir 3 mounted on the master brake cylinder 2, and a pedal assembly connected upstream of the brake power booster 1 and designated by reference numeral 4. A housing 20 of the brake force booster 1 includes attachment means (not shown), which permit attaching the brake force booster 1 and the pedal assembly 4 to a vehicle body wall 17. The pedal assembly 4 has a pedal mounting support 5 which is preferably configured as a U-profile. An actuating or brake pedal 6 for actuation of the pneumatic brake force booster 1 is pivotally mounted on a pivot axle 7. A design wherein a second pedal, preferably a clutch pedal, is pivotally mounted on the pivot axle 7 is of course also possible. A third pedal, for example, an accelerator pedal, can be mounted laterally on the pedal mounting support 5. The actuation of the brake force booster 1 is performed by a piston rod 10 articulated at the actuating pedal 6.

Figure 2:
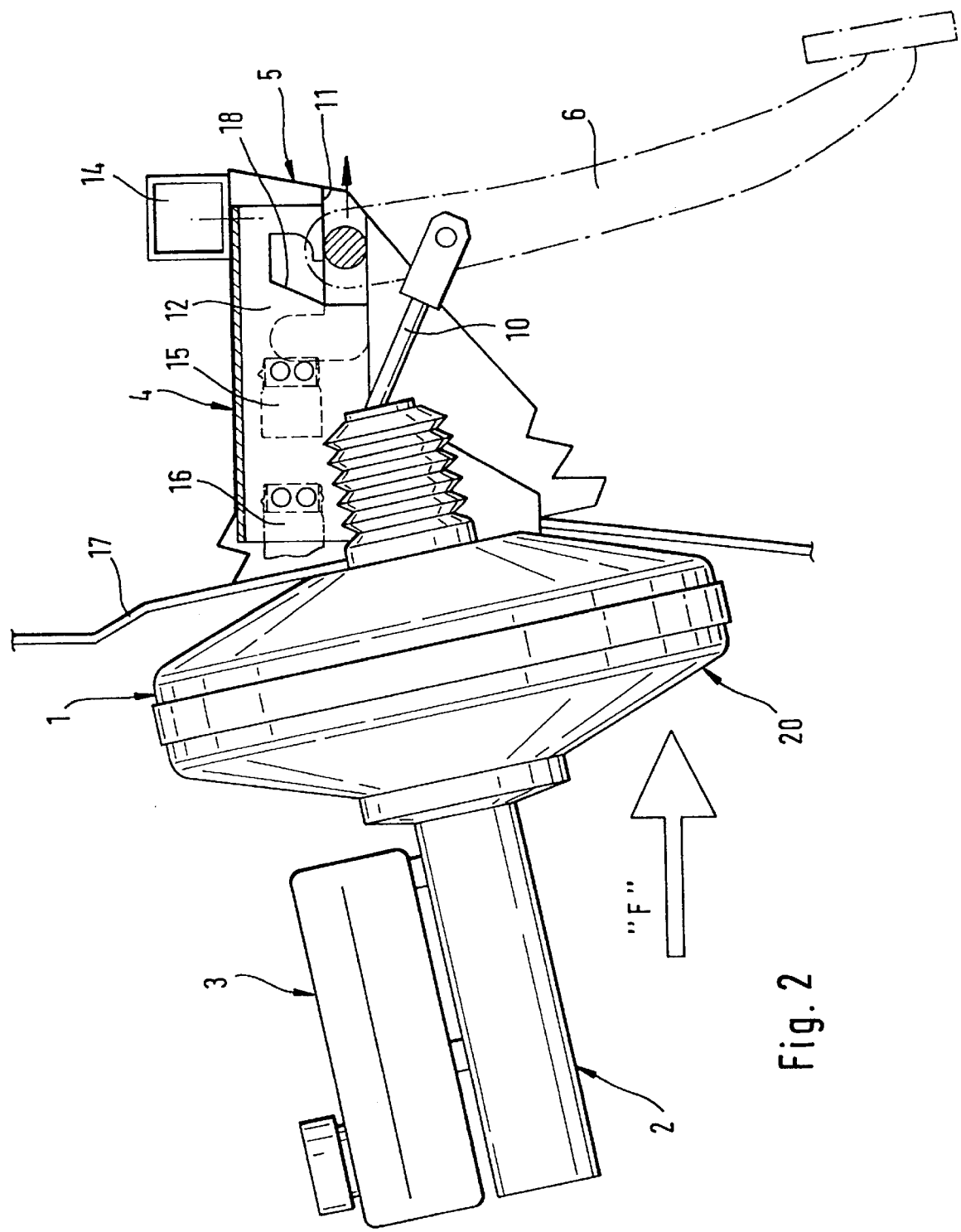
FIG. 2 is a view of the assembly according to FIG. 1 after a collision.
Figure 3:
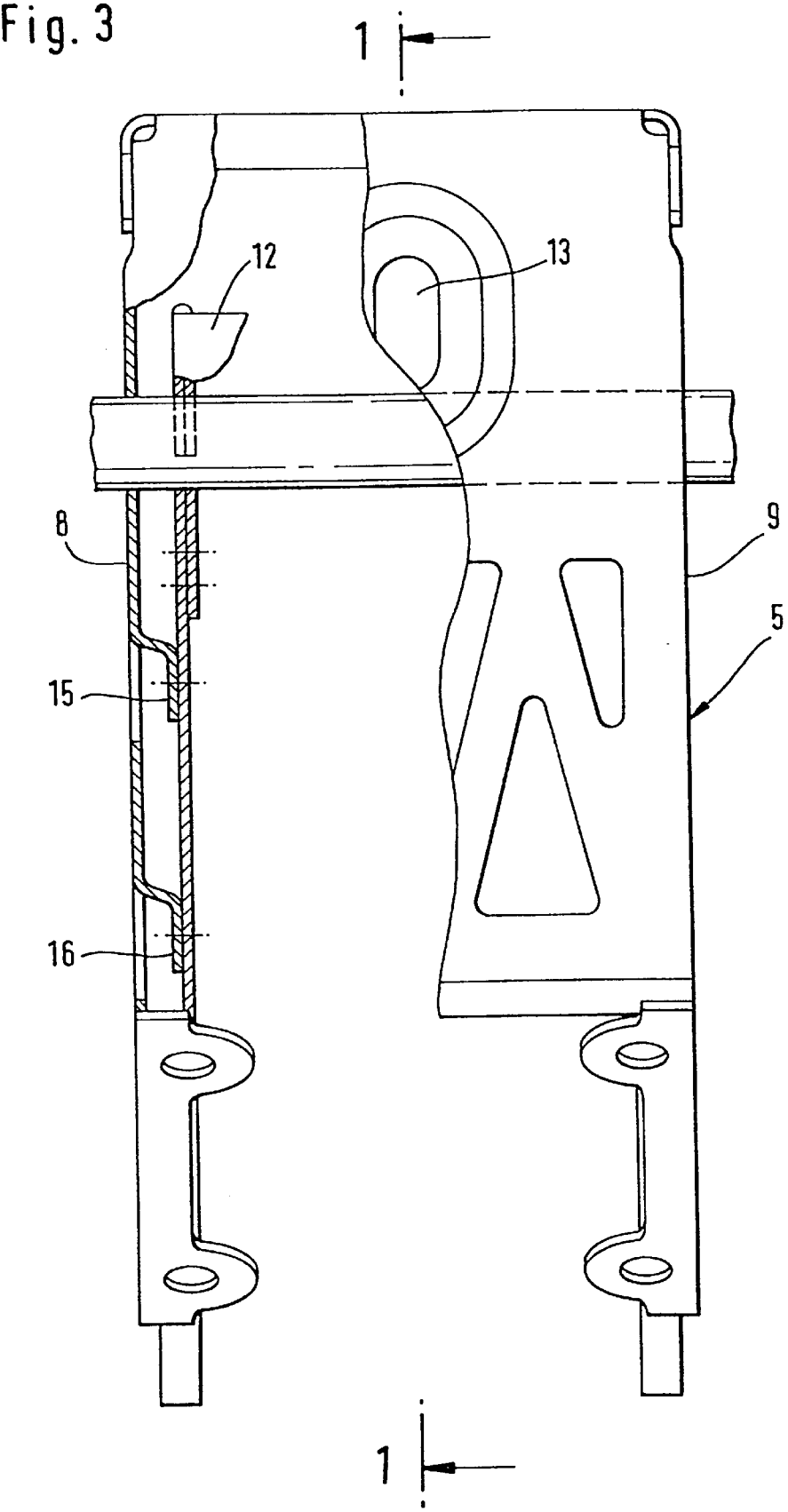
FIG. 3 is a simplified perspective view of the pedal assembly shown in FIGS. 1 and 2 in a cross-section taken along line 1—1.

As can be seen especially in the FIG. 3, the pedal mounting support 5 is generally formed by two opposed lateral walls 8, 9. In the coulisse-type guides 11 (FIGS. 1, 2) of the walls, the pivot axle 7 is mounted and retained by way of a securing element 12. An opening 13 is provided in the pedal mounting support 5 in the area adjacent to the bearing of the pivot axle 7. Opening 13 is used to connect the pedal mounting support 5 to another stationary vehicle body component part, for example, a chassis cross member which is assigned reference numeral 14. The securing element 12 is preferably configured as a stable U-profile, which is rigid as compared to the pedal mounting support. Securing element 12 is welded to lugs 15, 16 provided on the lateral walls 8, 9.

In a collision where a force is produced which acts upon the assembly in the direction of the arrow 'F' (FIG. 2), both the vehicle body wall 17 which carries the assembly and the front area of the pedal mounting support 5 associated with the brake force booster 1 are deformed. The rear attachment point 13, 14 of the pedal mounting support 5 is not deformed or is deformed with delay. The securing element 12, which has a comparatively stable design in terms of the crash behavior, is displaced rearwardly by the deformation of the pedal mounting support 5, and the lugs 15, 16 are simultaneously 'pulled open'. This action releases the pivot axle 7 in the coulisse-type guide 11. A slope 18 provided on the securing element 12 urges the pivot axle 7 downwardly to specifically push it out of the bearing. It is also possible to produce a defined force-travel ratio of the brake pedal 6 in a crash by a special configuration of the lugs 15, 16. This defined pedal ratio prevents the so-called 'bouncing impact' on the foot. For this purpose, the lateral walls 8, 9 of the pedal mounting support 5 include preset breaking points (not shown) which permit a defined 'pull-open' movement of the lugs 15, 16.

What is claimed is:

1. Brake pedal assembly for automotive vehicles, comprising:

a pedal mounting support including two opposed lateral walls, which provide points of support for a pivot axle of a pivotally mounted actuating pedal, coulisse-type guides, in which the pivot axle is retained by a securing element having a configuration of a U-profile, the pedal mount support including lugs, which are used to fasten the securing element, which, when moved by the action of a force that is caused in a collision, releases the pivot axle.

2. Brake pedal assembly as claimed in claim 1, wherein the securing element has a rigid design relative to the pedal mounting support.

3. Brake pedal assembly as claimed in claim 1, wherein the securing element is connected to the pedal mounting support by way of form-locking engagement.

4. Brake pedal assembly as claimed in claim 3, wherein the securing element is connected to the pedal mounting support by spot-welding, hard-soldering or clinching.

* * * * *

UNITED STATES PATENT AND TRADEMARK OFFICE
CERTIFICATE OF CORRECTION

| | | |
|---|---|---|
| PATENT NO. | : 6,112,616 | Page 1 of 1 |
| DATED | : September 5, 2000 | |
| INVENTOR(S) | : Jurgen Schonlau, Ralf Harth and Wolfgang Ritter | |

It is certified that error appears in the above-identified patent and that said Letters Patent is hereby corrected as shown below:

<u>Column 2,</u>
Line 52, change "mount" to -- mounting --.

Signed and Sealed this

Twentieth Day of August, 2002

Attest:

JAMES E. ROGAN
Attesting Officer
Director of the United States Patent and Trademark Office